No. 615,454. Patented Dec. 6, 1898.
T. B. JEFFERY.
PNEUMATIC TIRE.
(Application filed May 10, 1897.)
(No Model.)
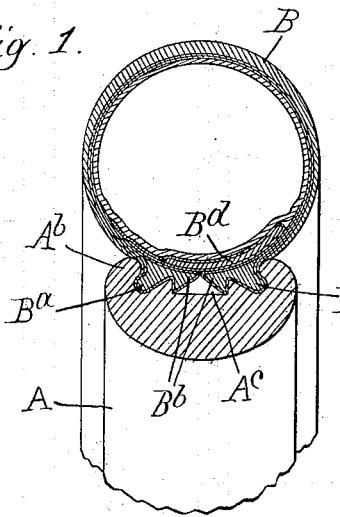
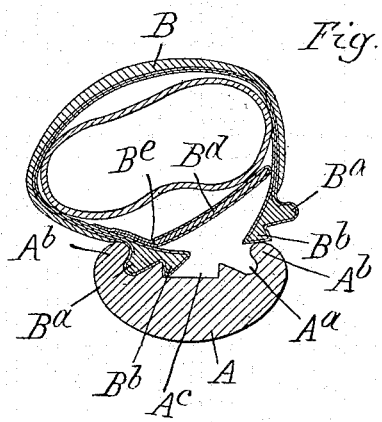
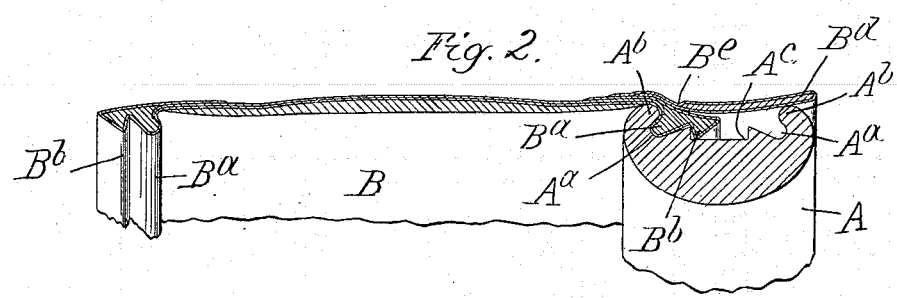
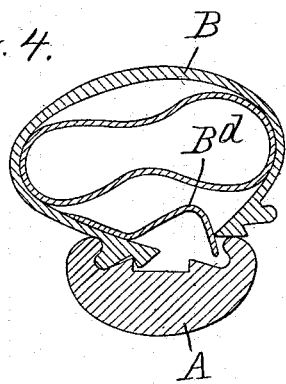
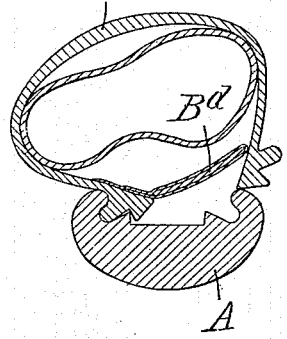
Witnesses.
E. T. Wray.
Jean Elliott.
Inventor.
Thos. B. Jeffery
By Burton and Burton
his Attys
THE NORRIS PETERS CO., PHOTO-LITHO., WASHINGTON, D. C.

UNITED STATES PATENT OFFICE.

THOMAS B. JEFFERY, OF CHICAGO, ILLINOIS.

PNEUMATIC TIRE.

SPECIFICATION forming part of Letters Patent No. 615,454, dated December 6, 1898.

Application filed May 10, 1897. Serial No. 635,840. (No model.)

*To all whom it may concern:*

Be it known that I, THOMAS B. JEFFERY, a citizen of the United States, residing at Chicago, county of Cook, and State of Illinois, have invented certain new and useful Improvements in Pneumatic Tires, which are fully set forth in the following specification, reference being had to the accompanying drawings, forming a part thereof.

In the drawings, Figure 1 is a transverse section of a wheel-rim and tire thereon embodying my invention, the same being shown with the air-tube inflated. Fig. 2 is a section of the same structure, the parts being shown in the position occupied after one edge of the tire has been engaged with the rim and before the engagement of the opposite edge. Fig. 3 is a similar section showing the parts in the position occupied while the second edge is being inserted into engagement, but before the engagement has been fully effected. Fig. 4 is a similar sectional view of a structure from which my invention is to be distinguished in respect to a certain feature thereof, the parts being shown in a position corresponding to Fig. 3 and illustrating the defect which my invention is designed to overcome. Fig. 5 is a view similar to Fig. 3, showing a slightly-modified construction in respect to the flap.

A is a wheel-rim of familiar construction, such as is employed in connection with the so-called "G. & J." tires and having at the periphery lateral recesses $A^a$ $A^a$, overhung by the lips $A^b$ $A^b$, these recesses being designed to receive the flanges $B^a$ $B^a$ of the tire B, and having also intermediate the recesses $A^a$ $A^a$ the peripheral recess $A^c$, which receives the angular flanges $B^b$ of the tire B.

The construction so far as above described, both as to the wheel-rim A and the tire B, involves no novelty. The novel feature of my improved tire consists in a flap wing or flange $B^d$, which extends from the inner surface of the tire, being united to the latter at or a little back of the edge which is first engaged with the rim, and is wide enough so that after that edge has been engaged with the rim said flap or flange extends over and covers all the remainder of the periphery of the rim, overhanging the outer margin at the opposite side. This flap is comparatively stiff, having sufficient flexibility to receive the normal curvature of the tire when the latter is inflated, but being too stiff to be liable to buckle or fold except where it is made flexible at or near the line of its junction with the inner surface of the tire, such flexibility being practically limited to a line—that is, not extending over sufficient portion of the width of the flap to permit a sinuosity or reflexed fold or buckle to be formed, but only extending far enough to constitute practically a hinge-joint for the flap. The value of this flange is that being too wide when fully extended to become lodged in the recess periphery of the rim and being too stiff to be folded and buckled, so as to become thus lodged or engaged, it will always be found completely overhanging the edge of the rim after the first edge of the tire has been engaged with said rim, and when the operator attempts to insert the second edge the flap, being lifted off the edge of the rim by that edge, folds at the hinge-joint constituted by the flexible line $B^c$ mentioned and permits the second edge of the tire to pass in under it and become properly engaged with the recesses of the rim, while the flap laps the junction of the two edges with certainty of not becoming at any point in the circumference of the wheel entered in that joint. The inflation of the air-tube, it will be seen, presses the lapping flap or flange $B^d$ down onto the edges of the tire and tends to hold them both in place. By reference to Fig. 4 it will be understood that if the flap were narrow enough so that its edge might lodge in the peripheral recess of the rim instead of overhanging the outer marginal lip of the latter when the first edge of the tire is engaged with the rim, or if, while being wide enough to overhang the opposite margin of the rim, as described, it were flexible, so that it might be buckled or tucked back at some points in the circumference of the wheel and be thus engaged at such tucked points in the recess of the rim, great difficulty might be experienced in entering the second edge of the rim under such lip and in preventing the flap from occupying the space in the recess which is designed for the flange $B^a$ or from being caught between the abutting edges of the tire and so not only preventing the proper insertion and engagement of the tire, but also constituting a fold which would be inflated into the inflated air-tube and create liability of rupture in the latter.

It is not essential that the flap or flange $B^d$ should have its flexible junction with the tire back of the edge of the latter, though this form is preferable in the instance of tires which are secured to rims so narrow that the edges of the tire meet and abut in the peripheral recess of the rim. In Fig. 5 I have shown a tire secured in a wider rim, the edges not necessarily meeting, and in that figure I have shown the flap having its flexible junction with the tire at the edge instead of back of the edge.

I claim—

1. In combination with a wheel-rim peripherally recessed to afford a seat for the tire, a tire which is rifted at the inner circumference and has lateral beads or flanges parallel to the rift adapted to engage the recess in the wheel-rim; a flap wing or flange which is united to the tire at or near one edge of the rift, and which is of such width that when said edge is seated in the recess of the rim, the wing or flap entirely covers the remainder of the tire-seat, such wing or flap being transversely stiff except at a circumferential line at or near its junction with the tire-body, whereby it operates with a hinge-like action at such line as and for the purpose set forth.

2. In combination with a wheel-rim which has a peripheral recess to afford a seat for the tire; a tire which is rifted at its inner circumference and provided with lateral beads or flanges to engage the rim located at such distances back from the edges of the rift that the sum of said distances substantially equals the entire width of the recess in the rim; a transversely stiff flap wing or flange flexibly united to the tire at the inner edge at a short distance back from one edge of the rift, such flap being of suitable width to cover the tire-seat in the rim when said edge is duly seated therein.

3. In combination with a wheel-rim which has a peripheral recess to afford a seat for the tire, a tire which is rifted at its inner circumference and provided with lateral beads or flanges to engage the rim; a flap wing or flange which is united to the tire at or near one edge of the rift and adapted to extend therefrom over the entire width of the recess in the rim, such flap wing or flange being reduced in stiffness at a line remote from its free edge.

In testimony whereof I have hereunto set my hand, in the presence of two witnesses, at Chicago, Illinois, this 6th day of May, 1897.

THOS. B. JEFFERY.

Witnesses:
CHAS. S. BURTON,
JEAN ELLIOTT.